(12) United States Patent
Pierpont

(10) Patent No.: US 7,891,345 B2
(45) Date of Patent: Feb. 22, 2011

(54) EGR SYSTEM HAVING MULTIPLE DISCHARGE LOCATIONS

(75) Inventor: David Andrew Pierpont, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 360 days.

(21) Appl. No.: 12/222,847

(22) Filed: Aug. 18, 2008

(65) Prior Publication Data

US 2010/0037601 A1      Feb. 18, 2010

(51) Int. Cl.
  *F02B 47/08*  (2006.01)
  *F02M 25/07*  (2006.01)
(52) U.S. Cl. .............. 123/568.17; 123/568.12; 60/605.2
(58) Field of Classification Search .......... 123/568.11, 123/568.17, 568.18, 568.2; 60/605.2
  See application file for complete search history.

(56) References Cited

U.S. PATENT DOCUMENTS

| | | | |
|---|---|---|---|
| 4,024,847 A | 5/1977 | Koganemaru | |
| 4,041,913 A | 8/1977 | Nohira | |
| 4,134,376 A | 1/1979 | Tokushima et al. | |
| 4,135,481 A | 1/1979 | Resler, Jr. | |
| 4,137,879 A | 2/1979 | Kageyama et al. | |
| 4,249,382 A | 2/1981 | Evans et al. | |
| 4,640,256 A | 2/1987 | Conrad et al. | |
| 5,957,116 A * | 9/1999 | Haegele et al. | 123/568.12 |
| 6,138,651 A * | 10/2000 | Mori et al. | 123/568.17 |
| 6,237,336 B1 | 5/2001 | Feucht et al. | |
| 6,293,266 B1 | 9/2001 | Oetting | |
| 6,401,699 B1 * | 6/2002 | Persson et al. | 123/568.12 |
| 6,513,508 B2 | 2/2003 | Fischer et al. | |
| 6,609,374 B2 | 8/2003 | Feucht et al. | |
| 6,901,746 B2 | 6/2005 | Nishiyama et al. | |
| 7,036,493 B1 | 5/2006 | Huebler et al. | |
| 7,287,378 B2 | 10/2007 | Chen et al. | |
| 7,389,770 B2 | 6/2008 | Bertilsson et al. | |

* cited by examiner

*Primary Examiner*—Stephen K Cronin
*Assistant Examiner*—Anthony L Bacon
(74) *Attorney, Agent, or Firm*—Finnegan, Henderson, Farabow, Garrett & Dunner LLP

(57) ABSTRACT

An exhaust gas recirculation system for a use with an engine having a plurality of cylinders is disclosed. The exhaust gas recirculation system may have an intake passage configured to direct combustion air to all of the plurality of cylinders, and an exhaust passage configured to receive exhaust from fewer than all of the plurality of cylinders. The exhaust gas recirculation system may also have a plurality of separate exhaust conduits in parallel communication with the exhaust passage and configured to direct exhaust from the exhaust passage to the intake passage at multiple locations along a length direction of the intake passage. The multiple locations may be separated from each other by a volume within the intake passage, and the volume may be a function of a total number of the plurality of cylinders, a number of the plurality of cylinders contributing exhaust to the exhaust passage, and a number of the multiple locations.

20 Claims, 3 Drawing Sheets

EGR SYSTEM HAVING MULTIPLE DISCHARGE LOCATIONS

TECHNICAL FIELD

The present disclosure is directed to an exhaust gas recirculation (EGR) system and, more particularly, to an exhaust gas recirculation system having multiple discharge locations.

BACKGROUND

Internal combustion engines such as diesel engines, gasoline engines, and gaseous fuel-powered engines exhaust a complex mixture of air pollutants as byproducts of the combustion process. These air pollutants are composed of gaseous compounds including, among other things, the oxides of nitrogen (NOx). Due to increased attention on the environment, exhaust emission standards have become more stringent and the amount of NOx emitted to the atmosphere from an engine can be regulated depending on the type of engine, size of engine, and/or class of engine.

One method that has been implemented by engine manufacturers to comply with the regulation of these engine emissions has been to implement exhaust gas regeneration (EGR). EGR systems recirculate exhaust gas to mix with combustion air supplied to an engine. The recirculated exhaust gas reduces a concentration of oxygen and increases a thermal mass within the engine's cylinders, thereby lowering a resulting combustion temperature. The lowered combustion temperature slows the chemical reaction of the combustion process and decreases the formation of NOx.

Although successful at reducing NOx, the effectiveness of an EGR system can vary based on an ability to mix the recirculated exhaust with air prior to the mixture being received and combusted within the engine's cylinders. That is, when the recirculated exhaust is thoroughly mixed with combustion air, each cylinder receiving that mixture produces sufficient power and emits exhaust with a low NOx concentration. However, if the exhaust is poorly mixed with the combustion air, some cylinders may receive a mixture having a high concentration of exhaust and correspondingly produce little power, while other cylinders may receive a mixture having a low concentration of exhaust and correspondingly produce excessive amounts of NOx. This situation can be exacerbated when fewer than all of the engine's cylinders contribute exhaust for the recirculation process, as the resulting pulses of recirculated exhaust from the contributing cylinders are not equally distributed during the ensuing intake strokes of the engine.

U.S. Pat. No. 6,237,336 to Feucht et al. ("the '336 patent") discloses an EGR system that attempts to improve the distribution and mixing of recirculated exhaust with combustion air. Specifically, the '336 patent describes a six-cylinder, turbocharged engine having an exhaust manifold connected to three of the engine's cylinders, and an intake manifold providing combustion air to all of the cylinders. The EGR system includes a mixing vessel having two inlets, an outlet, and a mixing chamber. A first of the inlets is fluidly connected to the exhaust manifold, while a second of the inlets is fluidly connected to a turbocharger. The outlet is fluidly connected with the intake manifold.

A volume of the mixing vessel of the '336 patent is set equal to the displacement volume of two cylinders. The first inlet extends alongside the vessel and includes two discharge openings into the vessel, which are spaced apart along a length of the inlet by the volume of one cylinder displacement. In this manner, exhaust pulses received from each of the three contributing cylinders may be used to create two discharge pulses of exhaust into the mixing vessel (six total pulses per cycle) that are separated by the volume of one cylinder displacement such that the recirculated exhaust gas is evenly distributed and received by the six cylinders of the engine during the ensuing intake strokes.

Although the system in the '336 patent may be an improvement over prior systems, it may still be less than optimal. Specifically, because the discharge openings extend along a length of the inlet, the flows of exhaust from the exhaust manifold into the vessel may not be true parallel flows. As a result, downstream openings may discharge exhaust at a lower pressure and flow rate than upstream openings, and the exhaust pulses discharged into the flow of combustion air could be inconsistent. In some applications, inconsistent exhaust pulses could cause performance of the engine to be less than desired.

The disclosed exhaust gas recirculation system is directed to overcoming one or more of the problems set forth above and/or other problems of the prior art.

SUMMARY

In one aspect, the disclosure is directed toward an exhaust gas recirculation system for an engine having a plurality of cylinders. The exhaust gas recirculation system may include an intake passage configured to direct combustion air to all of the plurality of cylinders, and an exhaust passage configured to receive exhaust from fewer than all of the plurality of cylinders. The exhaust gas recirculation system may also include a plurality of separate exhaust conduits in parallel communication with the exhaust passage and configured to direct exhaust from the exhaust passage to the intake passage at multiple locations along a length direction of the intake passage. The multiple locations may be separated from each other by a volume within the intake passage, and the volume may be a function of a total number of the plurality of cylinders, a number of the plurality of cylinders contributing exhaust to the exhaust passage, and a number of the multiple locations.

In another aspect, the disclosure is directed toward a method of operating an engine having a plurality of cylinders. The method may include directing air into the plurality of cylinders, and combusting a mixture of air and fuel within the plurality of cylinders to generate a power output and a flow of exhaust. The method may also include redirecting multiple flows of the exhaust to mix with the air at locations spaced apart from each other by a volume of air prior to combustion. The multiple flows of exhaust may have substantially identical pressures and flow rates, and the multiple flows of exhaust may branch from a single location to mix with the air. The volume may be a function of a total number of the plurality of cylinders, a number of the plurality of cylinders contributing exhaust to mix with air, and a number of the multiple flows of exhaust.

DETAILED DESCRIPTION

Figure 1:
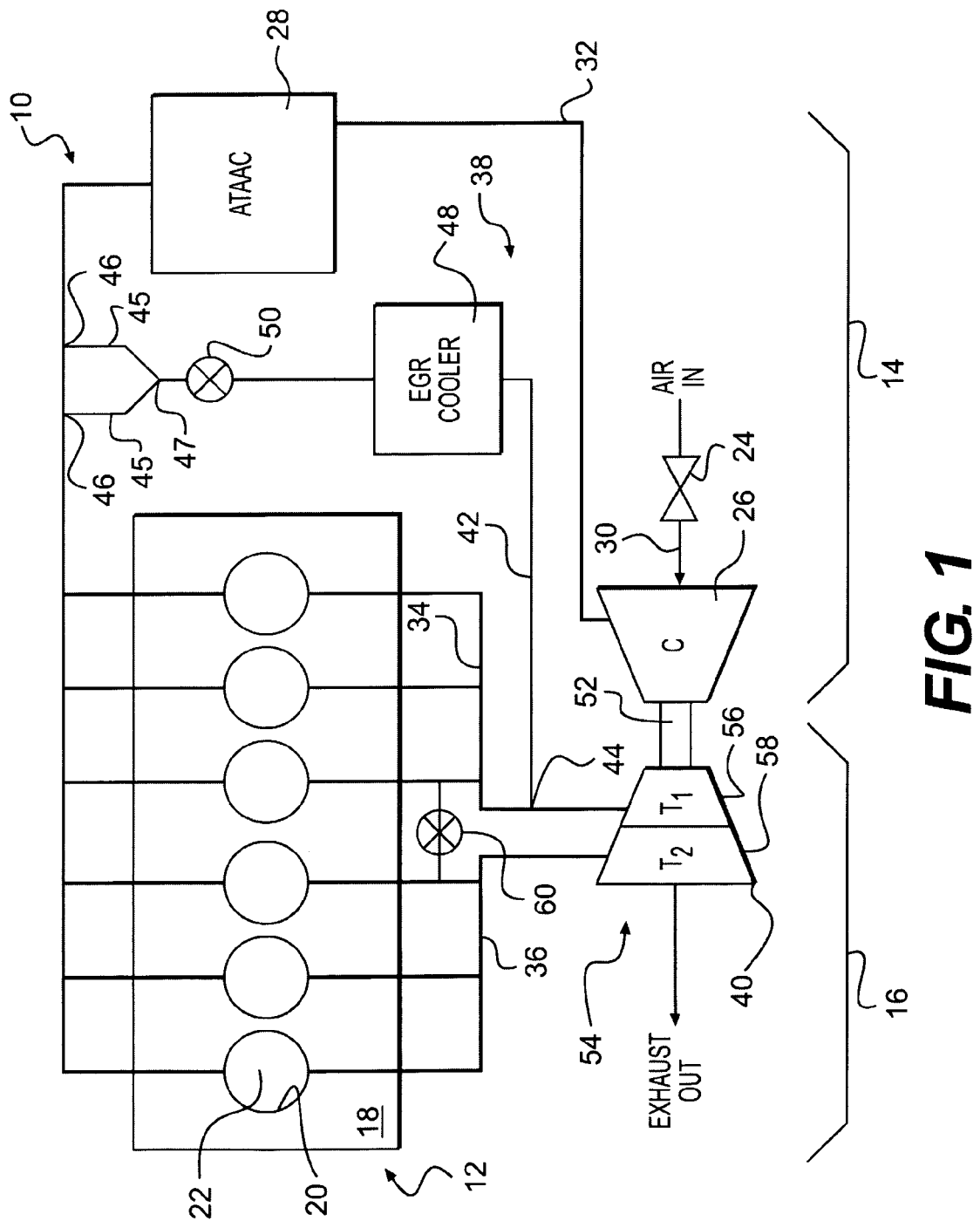
FIG. 1 is a diagrammatic illustration of an exemplary disclosed power system.

FIG. 1 illustrates a power system 10 having a power source 12, an air induction system 14 configured to direct air into power source 12, and an exhaust system 16 configured to direct exhaust away from power source 12. For the purposes of this disclosure, power source 12 is depicted and described as a diesel engine. One skilled in the art will recognize, however, that power source 12 may be any other type of combustion engine such as, for example, a gasoline or a gaseous fuel-powered engine. Power source 12 may include an engine block 18 that at least partially defines a plurality of cylinders 20. A piston (not shown) may be slidably disposed within each cylinder 20 to reciprocate between a top-dead-center position and a bottom-dead-center position, and a cylinder head (not shown) may be associated with each cylinder 20. Cylinder 20, the piston, and the cylinder head may form a combustion chamber 22. In the illustrated embodiment, power source 12 includes six such combustion chambers 22. However, it is contemplated that power source 12 may include a greater or lesser number of combustion chambers 22 and that combustion chambers 22 may be disposed in an "in-line" configuration, a "V" configuration, or in any other suitable configuration.

In one embodiment, power source 12 may be a four stroke engine. That is, for each complete engine cycle (i.e., for every two full crankshaft rotations), each piston with each cylinder 20 may move through an intake stroke, a compression stroke, a combustion or power stroke, and an exhaust stroke. As such, during each complete cycle, for the depicted six cylinder engine, there may be six strokes during which air is drawn into individual combustion chambers 22 from air induction system 14, and six strokes during which exhaust is expelled from individual combustion chambers 22 to exhaust system 16. When examining fluid flow through air induction and exhaust systems 14, 16, these strokes may correspond with pulsations of air and exhaust within the respective systems.

Air induction system 14 may include components configured to introduce charged air into power source 12. For example, air induction system 14 may include an induction valve 24, one or more compressors 26, and an air cooler 28. Induction valve 24 may be connected upstream of compressor 26 via a fluid passage 30 and configured to regulate a flow of atmospheric air to power source 12. Compressor 26 may embody a fixed or variable geometry compressor configured to receive air from induction valve 24 and compress the air to a predetermined pressure level before the air enters power source 12. Compressor 26 may be connected to power source 12 via a fluid passage 32. Air cooler 28 may be disposed within fluid passage 32, between power source 12 and compressor 26, and embody, for example, an air-to-air heat exchanger, an air-to-liquid heat exchanger, or a combination of both to facilitate the transfer of thermal energy to or from the compressed air directed into power source 12.

Exhaust system 16 may include components configured to direct exhaust from power source 12 to the atmosphere. Specifically, exhaust system 16 may include first and second exhaust manifolds 34 and 36 in fluid communication with combustion chambers 22, an exhaust gas recirculation (EGR) circuit 38 fluidly communicating first exhaust manifold 34 with air induction system 14, and a turbine 40 associated with first and second exhaust manifolds 34, 36. It is contemplated that exhaust system 16 may include components in addition to those listed above such as, for example, oxidizers (DOC), particulate removing devices (DPF, CDPF), constituent absorbers or reducers (SCR, AMOX, LNT), attenuation devices (mufflers), controllers, etc., if desired.

Exhaust produced during the combustion process within combustion chambers 22 may exit power source 12 via either first exhaust manifold 34 or second exhaust manifold 36. First exhaust manifold 34 may fluidly connect a first plurality of combustion chambers 22 (e.g., the first three combustion chambers 22 from the right shown in FIG. 1) to turbine 40. Second exhaust manifold 36 may fluidly connect a second plurality of combustion chambers 22 (e.g., the final three combustion chambers from the right shown in FIG. 1) to turbine 40. Although shown as connecting equal numbers of combustion chambers 22 to turbine 40, it is contemplated that first exhaust manifold 34 may connect a greater or lesser number of combustion chambers 22 to turbine 40 than second exhaust manifold 36, if desired.

EGR circuit 38 may include components that cooperate to redirect a portion of the exhaust produced by power source 12 from first exhaust manifold 34 to air induction system 14. Specifically, EGR circuit 38 may include an exhaust passage 42 having at least one inlet port 44 located at one end, and a plurality of separate exhaust conduits 45 connecting an opposing end of exhaust passage 42 with multiple spaced apart outlet ports 46 in a parallel manner. An EGR cooler 48 and a recirculation control valve 50 may be located within exhaust passage 42 between inlet port 44 and exhaust conduits 45. Inlet port 44 may be fluidly connected to first exhaust manifold 34 upstream of turbine 40, while outlet ports 46 may discharge exhaust to air induction system 14 at multiple spaced apart locations upstream and/or downstream of air cooler 28. Recirculation control valve 50 may be disposed within exhaust passage 42, between EGR cooler 48 and outlet ports 46. It is contemplated that one or more check valves, for example reed-type check valves (not shown) may be situated within exhaust passage 42 upstream or downstream of recirculation control valve 50 at locations near where exhaust mixes with inlet air to provide for a unidirectional flow of exhaust through EGR circuit 38 (i.e., to inhibit bidirectional exhaust flows through EGR circuit 38), if desired.

Turbine 40 may be a fixed or variable geometry turbine configured to drive compressor 26. For example, turbine 40 may be directly and mechanically connected to compressor 26 by way of a shaft 52 to form a turbocharger 54. As the hot exhaust gases exiting power source 12 move through turbine 40 and expand against blades (not shown) therein, turbine 40 may rotate and drive the connected compressor 26 to pressurize inlet air.

Turbine 40 may include a divided housing having a first volute 56 fluidly connected with first exhaust manifold 34, and a second volute 58 fluidly connected with second exhaust manifold 36 (i.e., turbocharger 54 may have dual volutes). It should be understood that at least a part of first volute 56 may have a smaller cross-sectional area or area/radius of curvature (A/R) ratio than second volute 58. The smaller cross-sectional area or A/R ratio may help restrict a flow of exhaust through first exhaust manifold 34, thereby creating backpressure sufficient to drive at least a portion of the exhaust from first exhaust manifold 34 through EGR circuit 38. It is contemplated that, instead of a single turbine having dual volutes, multiple turbines or multiple turbochargers may alternatively be implemented, if desired.

A balance valve 60 may be mounted upstream of turbine 40 (integral or separate from turbocharger 54) and fluidly communicated with both first and second volutes 56, 58 by way of first and second exhaust manifolds 34, 36. Balance valve 60 may be configured to regulate a pressure of exhaust flowing through first exhaust manifold 34 and, subsequently first volute 56, by selectively allowing exhaust to flow from first exhaust manifold 34 to second exhaust manifold 36. It should be understood that the pressure within first exhaust manifold 34 may affect an amount of exhaust directed through EGR circuit 38. That is, when exhaust flows from first exhaust manifold 34 to second exhaust manifold 36 by way of balance valve 60, a pressure within first exhaust manifold 34 may be reduced and, as a result of this pressure reduction, an amount of exhaust passing from first exhaust manifold 34 through EGR circuit 38 and through first volute 56 may be reduced proportionally. It should also be noted that, because exhaust may be selectively allowed to flow from first exhaust manifold 34 to second exhaust manifold 36, a differential between the flow rates within first and second volutes 56 and 58 may be minimized, thereby minimizing an impact the pressure differential may have on turbocharger efficiency.

Figure 2:
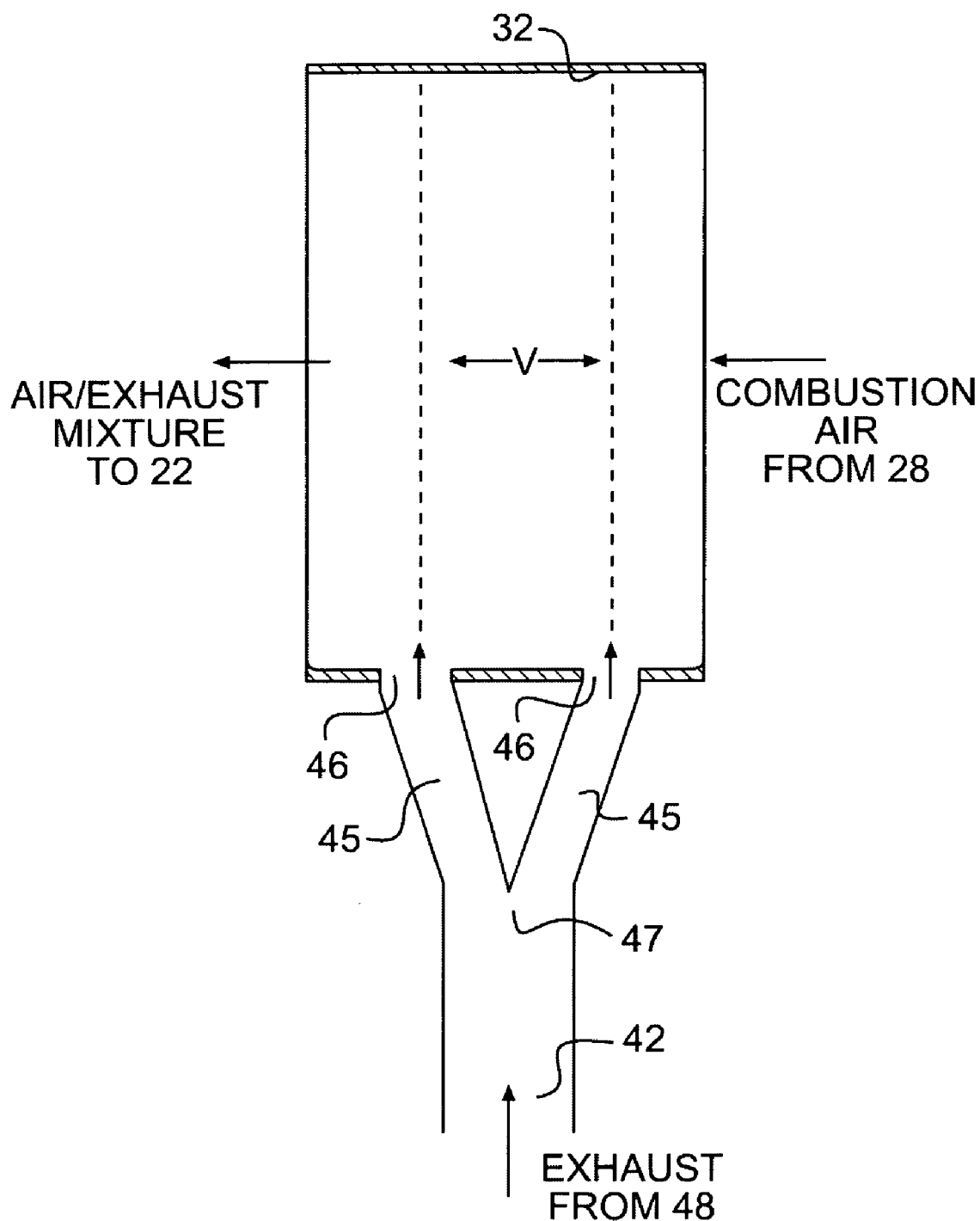
FIG. 2 is a diagrammatic illustration of a portion of an exhaust gas recirculation system that may be used with the power system of FIG. 1.
Figure 3:
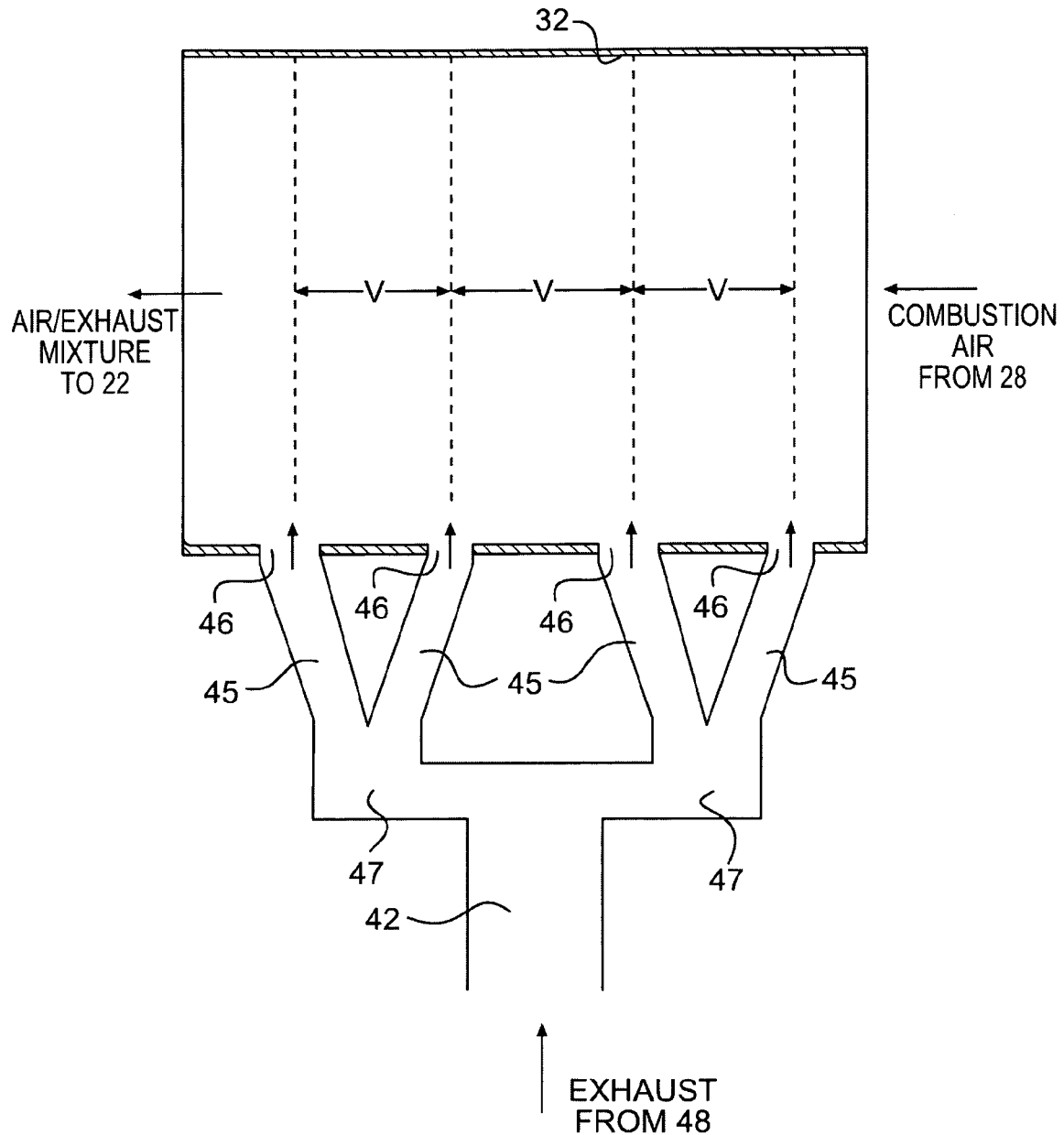
FIG. 3 is a diagrammatic illustration of a portion of another exemplary exhaust gas recirculation system that may be used with the power system of FIG. 1.

As can be seen in FIGS. 2 and 3, exhaust conduits 45 may connect to the end of exhaust passage 42 by way of a "Y"-type or a "T"-type connector 47 such that the pressures and the flow rates of exhaust passing through exhaust conduits 45 may be maintained substantially equal. Each of exhaust conduits 45 may direct parallel flows of exhaust through outlet ports 46 and into fluid passage 32 in a direction substantially orthogonal to or in the same, opposing, or different direction as a flow of air through fluid passage 32.

As can also be seen in FIGS. 2 and 3, outlet ports 46 may be separated from each other along a length direction of fluid passage 32 by a volume "V" within fluid passage 32 ("V" being about equal to the product of a cross-sectional area of fluid passage 32 and a distance between outlet ports 46). The volume "V" may be selected such that exhaust redirected from exhaust system 16 into air induction system 14 by EGR circuit 38 is substantially evenly distributed to each combustion chamber 22 during operation of power system 10. As described above with respect to a six cylinder engine, during a full engine cycle, six pulses of air may be drawn from air induction system 14 by combustion chambers 22, and six pulses of exhaust may be directed from combustion chambers 22 into exhaust system 16. And, in order to help ensure substantially equal distribution of the recycled exhaust relative to the combustion air, the pulses of recirculated exhaust should be substantially equally interspersed within the pulses of air. In a configuration where all six cylinders 20 of power system 10 equally contribute exhaust for recirculation back into power system 10, the exhaust pulses may be naturally directed into air induction system 14 between each pulse of air without any required intervention. However, when fewer than all of the engine's cylinders 20 contribute exhaust for recirculation, interspersing the exhaust pulses in a substantially equal manner can become more difficult and more important.

In the disclosed embodiments, the volume "V" may be a function of a total number of cylinders 20 included within power system 10, a number of cylinders 20 contributing exhaust to EGR circuit 38, a displacement volume of each cylinder 20, and a number of outlet ports 46 (i.e., a number of discharge locations along fluid passage 32). Specifically, the volume "V" may be represented by EQ. 1 below:

$$V = \frac{V_{cyl}(\# Cyl_{total})}{\# Cyl_{contributing} \# Outlets} \quad \text{EQ. 1}$$

wherein:

$V_{cyl}$ is the displacement volume of a single cylinder 20;

$\# Cyl_{total}$ is a total number of cylinders 20 included within power system 10;

$\# Cyl_{contributing}$ is a number of cylinders 20 contributing exhaust to EGR circuit 38;

and $\# Outlets$ is a number of outlet ports 46 included within power system 10 (i.e., a number of discharge locations into air induction system 14).

In the example of FIG. 2, the total number of cylinders 20 included within power system 10 is six, the number of cylinders 20 contributing exhaust to EGR circuit 38 is three, and the number of outlet ports 46 included within power system 10 is two. Thus, the volume "V" may be about equal to the displacement volume of one of cylinders 20. In this example, each pulse of exhaust from the three contributing cylinders 20 may be divided by connector 47 and exhaust conduits 45 into two smaller pulses, thereby creating six total pulses of exhaust during a single full engine cycle. With six total exhaust pulses, each exhaust pulse may be separated by the volume of one cylinder 20, such that a single pulse of recirculated exhaust is dispersed between or within each pulse of air drawn into combustion chambers 22.

In the example of FIG. 3, the total number of cylinders 20 included within power system 10 is still six, the number of cylinders 20 contributing exhaust to EGR circuit 38 is still three, but the number of outlet ports 46 is increased to four. As such, the volume "V" between each outlet port 46 may be about equal to $0.5(V_{cyl})$. In this example, each pulse of exhaust from the three contributing cylinders 20 may be divided into four smaller pulses, thereby creating twelve total pulses of recirculated exhaust during a single full engine cycle. With twelve total exhaust pulses, each exhaust pulse may be separated by about one half of the displacement volume of one cylinder 20, such that two pulses of exhaust are dispersed within each pulse of air drawn into combustion chambers 22.

It is contemplated that, instead of utilizing EQ. 1 above to determine the volume "V" between each of outlet ports 46, EQ. 1 may be rearranged for a fixed volume "V" to determine a number of outlet ports 46 and/or a number of cylinders 20 contributing exhaust for recirculation, if desired.

INDUSTRIAL APPLICABILITY

The disclosed exhaust gas recirculation (EGR) system may be implemented into any power system application where exhaust gas recirculation is utilized. The disclosed EGR system may offer improved distribution of recirculated exhaust gas in applications where fewer than all of the power system's cylinders contribute exhaust for recirculation. Specifically, the disclosed EGR system may divide each exhaust pulse from the power system's contributing cylinders into multiple substantially identical pulses, and equally distribute the identical pulses within combustion air that is subsequently drawn into the power system and combusted. Operation of power system 10 will now be described.

During operation of power system 10, air or an air and fuel mixture may be pressurized, cooled, and directed into cylinders 20 for subsequent combustion. Combustion of the air/fuel mixture may resulting a mechanical power generation directed from power system 10 by way of a rotating crankshaft. Byproducts of combustion, namely exhaust and heat, may be directed from power system 10 through turbine 40 to the atmosphere.

To help reduce the formation of NOx, some of the exhaust from first exhaust manifold 34 may be redirected through EGR circuit 38 to mix with fresh air entering combustion chambers 22. The amount of exhaust directed to mix with the air may be controlled by regulating operation of balance valve 60, recirculation control valve 50, and/or turbine 40. As the exhaust flows through EGR circuit 38, it may be divided by connector 47 into multiple flows of exhaust having substantially identical pressures and flow rates, and directed into fluid passage 32 by way of exhaust conduits 45. This recirculation of exhaust may help dilute the mixture and increase the thermal mass within combustion chambers 22, resulting in a lower combustion temperature and a decreased rate of NOx formation.

By dividing the recirculated exhaust flows into multiple substantially identical pulses of exhaust directed into fluid passage 32, distribution of the exhaust within air induction system 14 may be improved. And, the spacing between and the number of outlet ports 46 may selected according to a suitable equation such as EQ. 1 to enhance distribution and mixing. Well-distributed and mixed pulses of recirculated exhaust may help improve power production and emission reduction performance of power system 10.

It will be apparent to those skilled in the art that various modifications and variations can be made to the disclosed EGR system. Other embodiments will be apparent to those skilled in the art from consideration of the specification and practice of the disclosed EGR system. It is intended that the specification and examples be considered as exemplary only, with a true scope being indicated by the following claims and their equivalents.

What is claimed is:

1. An exhaust gas recirculation system for an engine having a plurality of cylinders, comprising:
   an intake passage configured to direct combustion air to all of the plurality of cylinders;
   an exhaust passage configured to receive exhaust from fewer than all of the plurality of cylinders; and
   a plurality of separate exhaust conduits in parallel communication with the exhaust passage and configured to direct exhaust from the exhaust passage to the intake passage at multiple locations along a length direction of the intake passage,
   wherein the multiple locations are separated from each other by a volume within the intake passage, the volume being a function of a total number of the plurality of cylinders, a number of the plurality of cylinders contributing exhaust to the exhaust passage, and a number of the multiple locations.

2. The exhaust gas recirculation system of claim 1, wherein the volume is about equal to a product of a displacement volume of one of the plurality of cylinders and the total number of the plurality of cylinders divided by a product of the number of the plurality of cylinders contributing exhaust to the exhaust passage and the number of the multiple locations.

3. The exhaust gas recirculation system of claim 1, wherein the total number of cylinders is six, a number of the plurality of cylinders contributing exhaust to the exhaust passage is three, the number of the multiple locations is two, and the volume is about equal to a displacement volume of one of the plurality of cylinders.

4. The exhaust gas recirculation system of claim 1, wherein the plurality of separate exhaust conduits are fluidly connect to an end of the exhaust passage.

5. The exhaust gas recirculation system of claim 4, wherein the plurality of separate exhaust conduits are fluidly connected to the end of the exhaust passage by way of a "Y" type connector.

6. The exhaust gas recirculation system of claim 4, wherein the plurality of separate exhaust conduits are fluidly connected to the end of the exhaust passage by way of a "T" type connector.

7. The exhaust gas recirculation system of claim 4, wherein the plurality of separate exhaust conduits extend from the end of the exhaust passage substantially orthogonally to the intake passage.

8. The exhaust gas recirculation system of claim 1, wherein a flow rate and a pressure of exhaust passing through each of the plurality of separate exhaust conduits are maintained substantially equal.

9. The exhaust gas recirculation system of claim 1, further including a first exhaust manifold fluidly communicating a first group of the plurality of cylinders with a turbocharger, and a second exhaust manifold fluidly communicating a second group of the plurality of cylinders with the turbocharger, wherein the exhaust passage is in fluid communication with only the first exhaust manifold.

10. The exhaust gas recirculation system of claim 9, wherein a pressure of exhaust passing through the first exhaust manifold is greater than a pressure of exhaust passing through the second exhaust manifold.

11. The exhaust gas recirculation system of claim 9, further including a balance valve configured to selective communicate the first exhaust manifold with the second exhaust manifold.

12. The exhaust gas recirculation system of claim 1, further including:
    a cooler located within the exhaust passage; and
    a valve located downstream of the cooler to regulate exhaust flow through the exhaust passage.

13. A method of operating an engine having a plurality of cylinders, comprising:
    directing air into the plurality of cylinders;
    combusting a mixture of air and fuel within the plurality of cylinders to generate a power output and a flow of exhaust; and
    redirecting multiple flows of the exhaust to mix with the air at locations spaced apart from each other by a volume of air prior to combustion, wherein:
      the multiple flows of exhaust have substantially identical pressures and flow rates;
      the multiple flows of exhaust branch from a single location to mix with the air; and
      the volume is a function of a total number of the plurality of cylinders, a number of the plurality of cylinders contributing exhaust to mix with air, and a number of the multiple flows of exhaust.

14. The method of claim 13, wherein the volume is about equal to a product of a displacement volume of one of the plurality of cylinders and the total number of the plurality of cylinders divided by a product of the number of the plurality of cylinders contributing exhaust to mix with air and the number of the multiple flows of exhaust.

15. The method of claim 13, wherein the total number of cylinders is six, a number of the plurality of cylinders contributing exhaust to mix with air is three, the number of the multiple flows of exhaust is two, and the volume is about equal to a displacement volume of one of the plurality of cylinders.

16. The method of claim 13, wherein the multiple flows of exhaust branch from the single location in a "Y" or a "T" manner.

17. The method of claim 13, wherein the multiple flows extend from the single location substantially orthogonally to a flow of the air.

18. The method of claim 13, further including directing a first flow of exhaust from a first group of the plurality of cylinders to a turbocharger, and directing a second flow of exhaust from the first group of the plurality of cylinders to the turbocharger, wherein the multiple flows of exhaust are directed from only the first flow of exhaust.

19. The method of claim 18, wherein a pressure of the first flow of exhaust is greater than a pressure of the second flow of exhaust.

20. A power system, comprising:
a combustion engine having a first plurality of combustion chambers and a second plurality of combustion chambers;
a first exhaust manifold configured to receive exhaust from the first plurality of combustion chambers;
a second exhaust manifold configured to receive exhaust from the second plurality of combustion chambers in parallel with the first exhaust manifold;
a turbocharger configured to receive exhaust from the first and second exhaust manifolds;
an intake passage configured to direct combustion air to the first and second pluralities of cylinders;
an exhaust passage configured to receive exhaust from only the first exhaust manifold;
a cooler situated to cool exhaust flowing through the exhaust passage;
a valve located downstream of the cooler to regulate the flow of exhaust through the exhaust passage; and
a plurality of separate exhaust conduits in parallel communication with the exhaust passage and configured to direct exhaust from the exhaust passage to the intake passage at multiple locations along a length direction of the intake passage,
wherein the multiple locations are separated from each other by a volume within the intake passage, the volume being a function of a total number of the plurality of cylinders, a number of the plurality of cylinders contributing exhaust to the exhaust passage, and a number of the multiple locations.

* * * * *